(12) United States Patent
Yordanov et al.

(10) Patent No.: US 12,173,804 B2
(45) Date of Patent: Dec. 24, 2024

(54) SELF-SEALING BACKDRAFT DAMPER

(71) Applicants: Orlin Bogomilov Yordanov, Sofia (BG); Elena Aleksandrova Stefanova, Sofia (BG)

(72) Inventors: Orlin Bogomilov Yordanov, Sofia (BG); Elena Aleksandrova Stefanova, Sofia (BG)

( * ) Notice: Subject to any disclaimer, the term of this patent is extended or adjusted under 35 U.S.C. 154(b) by 1401 days.

(21) Appl. No.: 16/335,302

(22) PCT Filed: Sep. 21, 2017

(86) PCT No.: PCT/BG2017/000022
§ 371 (c)(1),
(2) Date: Mar. 21, 2019

(87) PCT Pub. No.: WO2018/053608
PCT Pub. Date: Mar. 29, 2018

(65) Prior Publication Data
US 2019/0346053 A1   Nov. 14, 2019

(30) Foreign Application Priority Data
Sep. 26, 2016  (BG) .......................................... 112393

(51) Int. Cl.
*F16K 15/04* (2006.01)
*F24F 13/12* (2006.01)

(52) U.S. Cl.
CPC .............. *F16K 15/04* (2013.01); *F24F 13/12* (2013.01)

(58) Field of Classification Search
CPC . F16K 15/04; F16K 1/14; F16K 1/228; F16K 1/2285; F16K 11/0445;
(Continued)

(56) References Cited

U.S. PATENT DOCUMENTS

| 619,705 A | 2/1899 | Knupp |
| 4,263,936 A * | 4/1981 | Brown .................... F16K 15/04 |
| | | 137/496 |

(Continued)

FOREIGN PATENT DOCUMENTS

| CN | 202418755 U | 5/2012 |
| RU | 147326 U1 | 10/2014 |

(Continued)

*Primary Examiner* — Avinash A Savani
*Assistant Examiner* — Ryan L Faulkner

(57) ABSTRACT

A self-sealing back draft damper for fully stopping backflow air through exhaust fans and extractor hoods. Contains a housing (1), with exit openings (2) and can have at least one mounting hole (10). Inside the housing (1) at least one inclined relative to the horizontal plane conical tapered tube (3) is airtightly fixed at its lower positioned narrow end to the hole (10), forming the conical tapered inlet (6) of the damper. Apertures are available on the tube part inside the housing. The tube (3) contains a spherical closing member (5) freely movable inside it, which closes the conical tapered inlet (6) and opens it when pushed away by airflow in direction to the vent. The axis of the tapered tube (3) can be also vertically oriented. The damper is airtightly attached preferably to the entrance of a fan, to the exhaust of an extractor hood or a vent.

11 Claims, 5 Drawing Sheets

(58) Field of Classification Search
CPC ........ F16K 24/00; F16K 24/046; F16K 31/18; F16K 15/1823; F16K 15/1843; F16K 17/02; F24F 13/12
USPC ......................................................... 454/353
See application file for complete search history.

(56) References Cited

U.S. PATENT DOCUMENTS

| | | | | |
|---|---|---|---|---|
| 5,201,340 | A * | 4/1993 | Teepe | B65D 88/747 |
| | | | | 137/433 |
| 5,509,445 | A | 4/1996 | Couet | |
| 7,854,238 | B2 | 12/2010 | Zatarain | |
| 9,781,908 | B1 * | 10/2017 | Bourisaw | A01K 63/006 |
| 2006/0200896 | A1 * | 9/2006 | Yang | F24F 13/10 |
| | | | | 4/213 |
| 2008/0178948 | A1 * | 7/2008 | Wilmshurst | F16K 15/04 |
| | | | | 137/513.5 |
| 2008/0185551 | A1 | 7/2008 | Schulz | |
| 2010/0269928 | A1 * | 10/2010 | Ford | F16K 15/04 |
| | | | | 137/533.19 |

FOREIGN PATENT DOCUMENTS

| | | | | |
|---|---|---|---|---|
| RU | 14732601 | | 10/2014 | |
| WO | WO-9506833 | A1 * | 3/1995 | ............. F16K 15/04 |

* cited by examiner

SELF-SEALING BACKDRAFT DAMPER

TECHNICAL FIELD

The proposed device is applied as a self-sealing back draft damper (check valve), completely preventing the backflow through air ventilation appliances and systems, such as for example domestic exhaust fans and extractor hoods. It is applicable as an additional accessory for already operating ventilation appliances or it can be provided as an add-on device for future appliances to be build. A possible use as a stand-alone device inside of air ducts or at the vents is also feasible.

BACKGROUND OF THE INVENTION

In contemporary homes the ventilation of bathrooms and kitchens is mainly achieved by the use of exhaust fans and extractor hoods conveying the air from the ventilated rooms to a vent. Under unfavorable weather conditions and combined with the fact that the fans and extractor hoods are being switched off for most of the time, the unhindered backflow of air leads to the occurrence of odors and moisture in the ventilated rooms and in the living space in general.

The market offers basically self-sealing back draft dampers in the form of butterfly valves, throttle valves, slats. As a consequence of their design, unavoidable gaps appear between the movable parts and the nonmoving sections of these devices. Even being minimal, the unwanted backflow of air from the vent to the ventilated room will become recognizable if in addition to moisture also strong odors are being transported.

Back draft dampers for domestic use operating with a ball as a closing member are described in published documents. However, they all have ball check valves containing a valve body and an additionally formed or mounted part for closing the valve body by a ball. Valve bodies of cylinder shape predominate.

The described valves contain additional parts in particular with complicated shapes or specially formed edges, gaskets, the dimensions of the ball and the duct have to be precisely adjusted, which is crucial for the valve to provide an airtight seal. If these requirements are not fulfilled, a gap may appear when the ball contacts the gasket and an airtight seal will not be provided. The descriptions represent layouts containing only one tube (duct). The inlet of the check valve and the ball have to be with sufficient dimensions in order to enable an optimal airflow, which would ask for an increase of the overall dimensions of the check valve and may lead to an unhandy mounting. In addition, using a cylindrical valve body and a ball as a closing member, both with compatible dimensions obstructs the airflow through the damper.

The present invention proposes a self-sealing back draft damper which is free from the above mentioned drawbacks, by constructing a back draft damper, being cheap and technologically not-demanding in production and mounting, providing an airtight seal against unwanted backflow, dependably operating for extended periods of time. The present invention represents a simpler construction and in addition eliminates the requirement for the precise adjustment between the dimensions of the individual parts of the valve. In addition to the layout suited for appliances ventilating bathrooms, a layout suited for kitchen extractor hoods is proposed.

DISCLOSURE OF THE INVENTION

A self-sealing back draft damper for a complete prevention of backflow air, such as through ventilation appliances and systems, is proposed. It preferably includes a valve housing formed as a hollow body having entering and exit openings with a valve body inside the housing. According to the invention, the housing has at least one exit opening and can have one or more than one mounting holes and inside the valve housing, there is, at least one tube of circular cross section with decreasing diameter along its axis-a conical tapered tube or another way saying a tube with frustoconical shape, with an axis inclined with respect to the horizontal plane, which can be regarded as a stationary valve body with a low-lying narrow end. The low lying narrow end of the conical tapered tube is airtightly fixed to the corresponding mounting hole of the valve housing, whereupon fixed in this way the narrow open end of the tube acts as a conical tapered inlet of the damper. The housing and the valve bodies may be provided as a unity part without the need of mounting holes. At least one aperture, enabling airflow out of the tube towards the exit openings of the valve housing has to be available on the tube contained inside the housing, preferably formed on the surface of the tube. Inside the body of the tube, there is a preferably spherical closing member with a possibility for free movement, whose diameter is smaller than the inner diameter of the larger end of the tube and comparable but not smaller than the inner diameter of the narrow end of the conical tapered tube. The damper is shut and the air cannot pass if the sphere is at the low-positioned narrow end of the valve body—at the conical tapered inlet inherently formed by the decreasing diameter of the tube. When the damper is at open position, the closing member is away from the inlet and without a possibility to leave the tapered tube through its larger end. Preferably, the length of the tube and its location within the housing can be such that the spherical closing member is being prevented to leave the tube by part of the surface of the housing without the need of additional protectors placed at the larger end of the tube. The weight of the spherical closing member and the slope of the tapered tube are such that in absence of airflow in the direction to the exit opening of the valve, the closing member is self-positioned at the conical tapered inlet and the spherical closing member can overcome the inclination on its path and is away from the inlet under force directed to the vent resulting from a pressure difference appearing between the exit openings and the inlet. The air flow can be drawn into the inlet preferably with a ventilation appliance. However, a self-ventilation is also possible.

This layout of the self-sealing damper, which contains at least one conical tapered tube with an axis, which is inclined, with respect to the horizontal plane, is in particular well suited for mounting the damper by airtightly attaching its site with the exit openings by means to the entrance of a fan. In a preferred arrangement, the exit openings are on the one side of the housing and the mounting holes are on the opposite site. Further, depending on the chosen arrangement, on the housing of the damper more than one mounting holes may be foreseen, with more than one valve bodies inside the housing being attached to each of them, whereby increasing the airflow. This layout describes also a stand-alone damper, mounted directly at a vent, inside of an air duct or behind a ventilation appliance.

Another preferred layout of the self-sealing damper incorporates a case in which the axis of the conical tapered tube is oriented vertically with respect to the horizontal plane. In this layout the spherical closing member has a possibility of almost vertical motion within the tube and without the possibility to leave the tube from the available apertures and openings. The mounting hole lies in the horizontal plane and the narrow end of the conical tapered tube is airtightly fixed to it. This layout is preferably recommended if the damper is to be mounted directly by proper means at the exhaust of a kitchen extractor hood or in a vertically oriented flue. If the damper is mounted at the exhaust of a kitchen extractor hood, it is recommended that the spherical closing member is made of heat-resistant material. The damper may contain more than one vertically oriented valve bodies. In a preferred arrangement, the exit openings are on the one side of the housing and the mounting holes are on the opposite site.

An additional manipulator could be mounted for the case that the spherical closing member has to be moved by force if the damper is mounted without offering a direct access to the closing member. Depending on the layout the manipulator may be implemented by a spring or a lever.

In all described layouts of the self-sealing damper, the spherical closing member is preferably a hollow body, made of material resisting to deformations for example a ping pong ball or a hollow sphere made of aluminum alloy.

In another layout of the self-sealing damper, the apertures available on the tapered tube are additionally equipped with protectors in order to prevent the spherical closing member against leaving the tube.

It has also to be noted that in order to increase the airflow through an open damper, the damper may be a hollow body containing inside of it more than one valve bodies carried out as conical tapered tubes, whose axes, depending on the layout, arrangement and further requirements, are inclined or vertically oriented relative to the horizontal plane, or a combination of both, whereupon each valve body contains one spherical closing member.

The main advantage of the proposed damper is its ability to prevent completely the occurrence of a backflow through exhaust fans and extractor hoods by means of an easily build- and mounted device, being dependable in operation, containing non-expensive parts, not demanding a precise adjustment of the dimensions of the closing member and those of the valve body. The possibility for more than one valve bodies to be mounted inside the housing, enables the airflow through the damper to be increased without the need of an extensive increase of the overall dimensions of the damper. By choosing a conical tapered tube with an inherently formed conical tapered inlet as a valve body containing the movable spherical closing member, the need for implementing of further rims, padding and flanges within the inlet of the valve body is omitted since the spherical closing member completely shuts the inlet of the valve when it stops at the position where the diameters of the tube and the sphere become nearly equal. The continuous increase of the diameter of the conical tapered tube along its axis enables the free movement of the spherical closing member within the tube's entire volume. The damper with any of the preferred layouts can be mounted horizontally, vertically or inclined with respect to the horizontal plane depending mainly on the arrangement of the exit holes of the valve housing. The device fully prevents external odors and humidity from entering the ventilated areas which represents a major issue in nowadays multi-story residential buildings. Moreover, if favorable winds- or conditions triggering even a weak airflow are present, the air pressure difference emerging between both sides of the valve body will be sufficient for the damper to open and to let an airflow to pass to the vent. In this way a self-initiating ventilation becomes possible and the long-term absence of air exchange is prevented.

BEST MODES OF CARRYING OUT THE INVENTION

Figure 1:
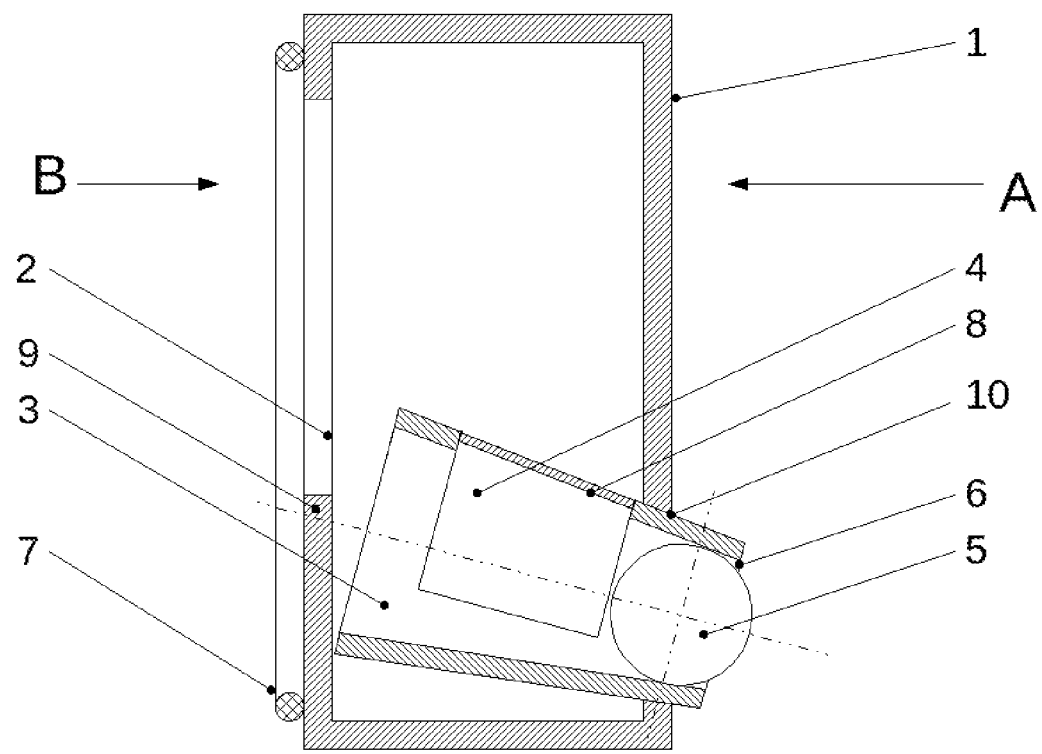
FIG. 1 is a cross-sectional view of the self-sealing back draft damper of the invention carried out with an inclined conical tapered tube as a valve body
Figure 2:
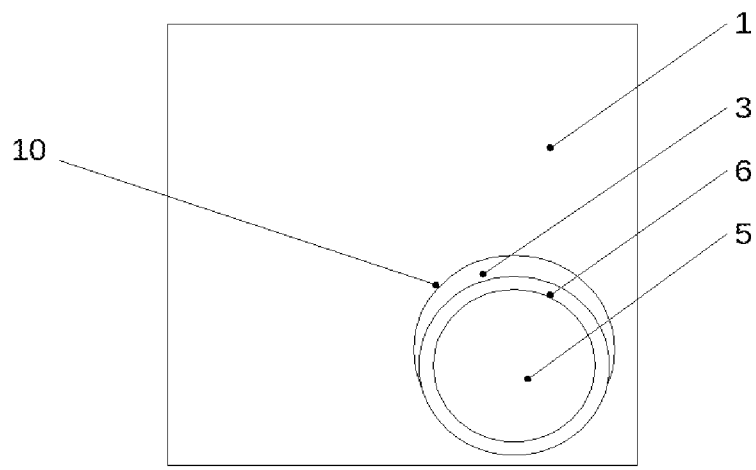
FIG. 2 is a schematic view in direction A from FIG. 1
Figure 3:
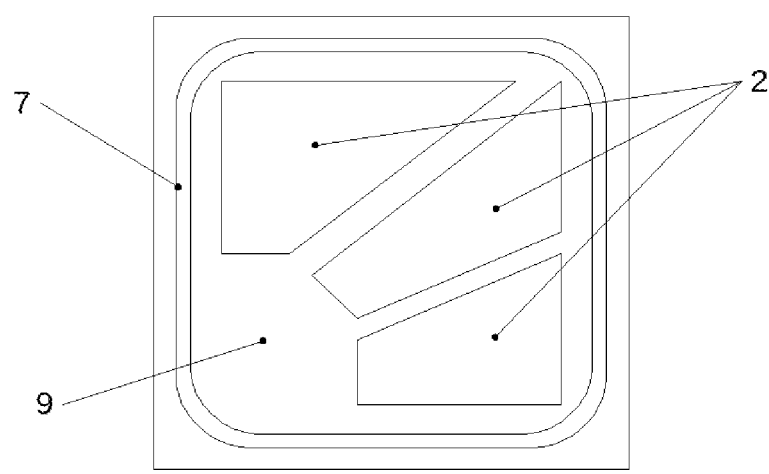
FIG. 3 is a schematic view in direction B from FIG. 1

Two preferred embodiments of the self-sealing damper are shown in FIGS. 1 to 5. A valve housing 1 made as a hollow body has exit openings 2 formed on it as shown in FIGS. 1 and 3. A tube 3 with a lengthwise decreasing diameter, conical tapered tube or another way saying a tube with frustoconical shape, intersects with its narrow end a mounting hole 10 formed on the surface of the housing 1, and is being fixed airtight to it. The conical tapered tube 3 is mounted inclined with respect to the horizontal plane. The lower-positioned narrow end of the tube 3 forms a conical tapered inlet 6 where the airflow is entering through. From the surface of the conical tapered tube 3, at least one aperture 4 is cut which is entirely located inside the housing 1. The dimensions of the aperture 4 are chosen sufficiently large, so that an unobstructed airflow through the aperture out of the tube towards the exit 2 of the valve housing is possible. The apertures may be in a form of strips. Another arrangement may be that instead of having an aperture 4, the air is going out of the tube through the larger end of the tube 3. A spherical closing member 5, made preferably hollow and of a non-deforming material, for instance a ping pong ball, moves freely inside the tube between the part 9 of the housing's 1 surface and the conical tapered inlet 6 at the narrow end of the conical tapered tube 3. The length and the position of the tube are such as the closing member 5 shall not be able to leave the tube. An alternative arrangement is to have protectors placed at the larger end of the tube 3 in order to stop the spherical member. The diameter of the spherical closing member 5 is smaller than the inner diameter of the conical tapered tube 3 at its largest section and is similar, but not smaller than the inner diameter of the tube 3 at its narrowest section. At the working position of the damper as shown in FIG. 1, in absence of an airflow towards the vent, the closing member 5 is self-positioned at the lower narrow end of the conical tapered tube 3 and seals the conical tapered inlet 6 of the damper. The damper is airtightly attached preferably to the entrance of an exhaust fan by a sealing strip 7 or by other properly suited means. The tiny protector 8 is added if the damper is used in combination with a powerful fan, or if the spherical closing member may leave the tube through the aperture 4. As an option, the described back draft damper could be fixed directly to the vent as a stand-alone device, or it may be positioned on the path of the airflow following an exhaust fan or an extractor hood.

Figure 4:
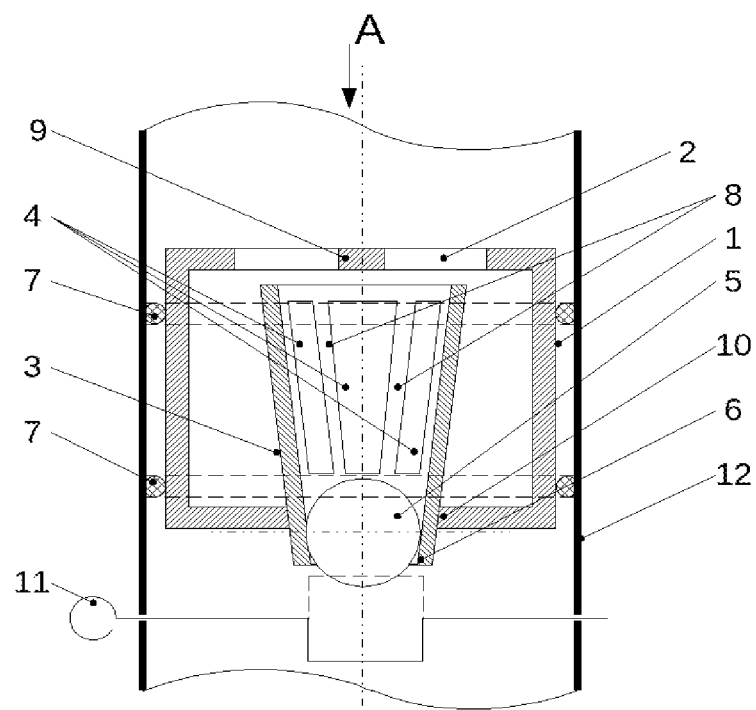
FIG. 4 is a cross-sectional view of the self-sealing back draft damper of the invention carried out with a vertically oriented conical tapered tube
Figure 5:
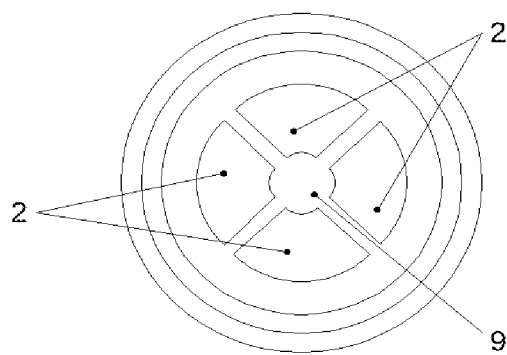
FIG. 5 is a schematic view in direction A from FIG. 4

Another preferred embodiment at which the axis of the conical tapered tube 3 is vertically oriented is shown in FIG. 4. This embodiment is recommended to be used in combination with a kitchen extractor hood, mounted preferably directly at the exhaust of the extractor hood. A conical tapered tube 3 intersects with its lower-positioned narrow end a circular mounting hole formed in the horizontal plane on the surface of the housing 1, made as a hollow body, and reaches the opposite surface 9 of the housing. On the surface of the tube, apertures 4, placed entirely inside the housing are formed, to which protectors 8 are being attached if necessary, and their dimensions are sufficient for an airflow to pass through unobstructed. In this case, on the surface of the housing 1, exit openings 2 are formed as shown in FIG. 5, whose dimensions are sufficient for the unobstructed passage of an airflow through them, while protecting at the same time the spherical closing member 5 from leaving the housing 1. The length of the tube is such as to prevent the closing member to leave the tube. The spherical closing member moves freely inside the tube within the space limited by the section 9 from the surface of the housing 1 and the conical tapered inlet 6 of the tube 3. If used with kitchen extractors, the spherical closing member is preferably made as a hollow body of light and heat-resistant material e.g. aluminum alloy. Due to the specific circumstances of the recommended application of this embodiment, optionally a manipulator 11, depending on the design it could be made also as a spring or a lever, is foreseen in case the spherical closing member 5 has to be enforced to move. By means of proper seals 7 the damper is preferably mounted inside the exit duct 12 of the kitchen extractor hood, without the duct being disrupted, whereby the entire airflow to the flue is driven through the damper.

Another embodiment comprises a valve body which is not mounted inside a hollow body, for instance the valve body is airtightly fixed, preferably vertically or inclined with respect to the horizontal plane, at its narrow end to a mounting hole, which is cut on a plate, the latter is airtightly fixed into an air duct. In this case a protector is mounted at the larger end of the tapered tube in order to prevent the spherical closing member to leave it. Alternatively the conical tapered tube with a build-in protector at its wide end, is directly fixed to an air duct by means of a sealing compound.

Figure 6:
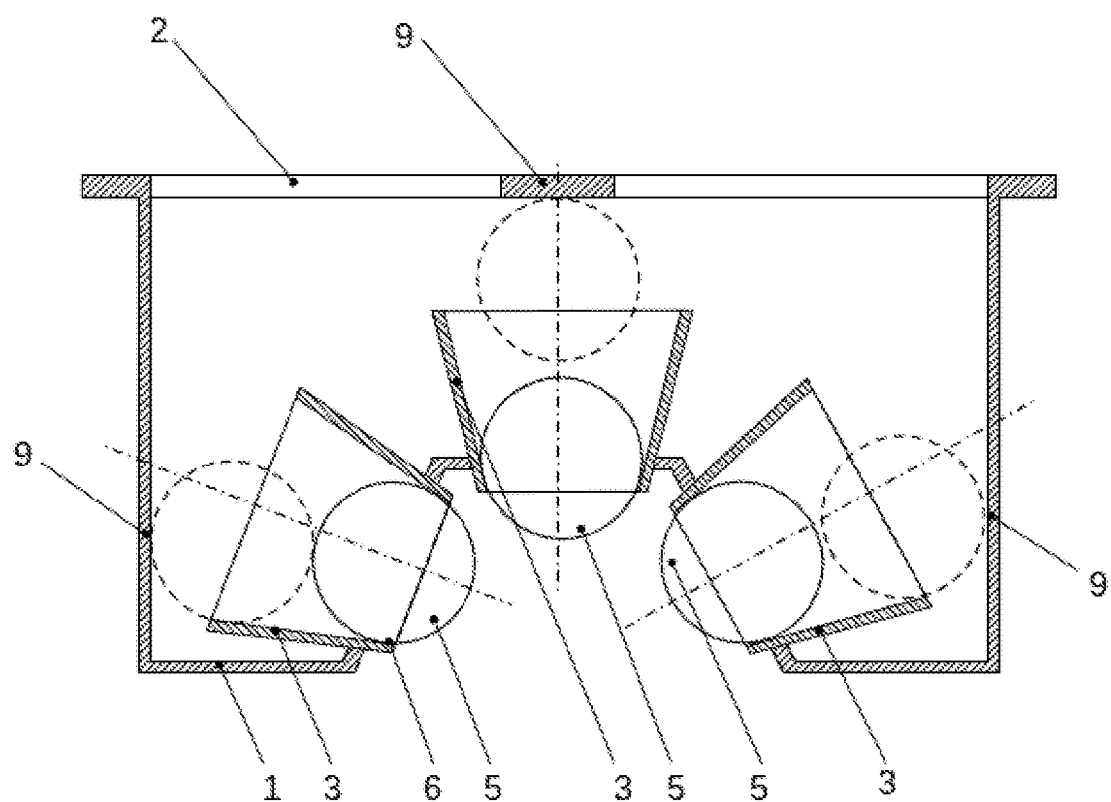
FIG. 6 is a cross-sectional view of the self-sealing back draft damper, suited for mounting on suspended ceilings, containing more than one conical tapered tubes as valve bodies, with axes individually inclined both at angle of 90° and angles different than 90° with respect to the horizontal plane
Figure 7:
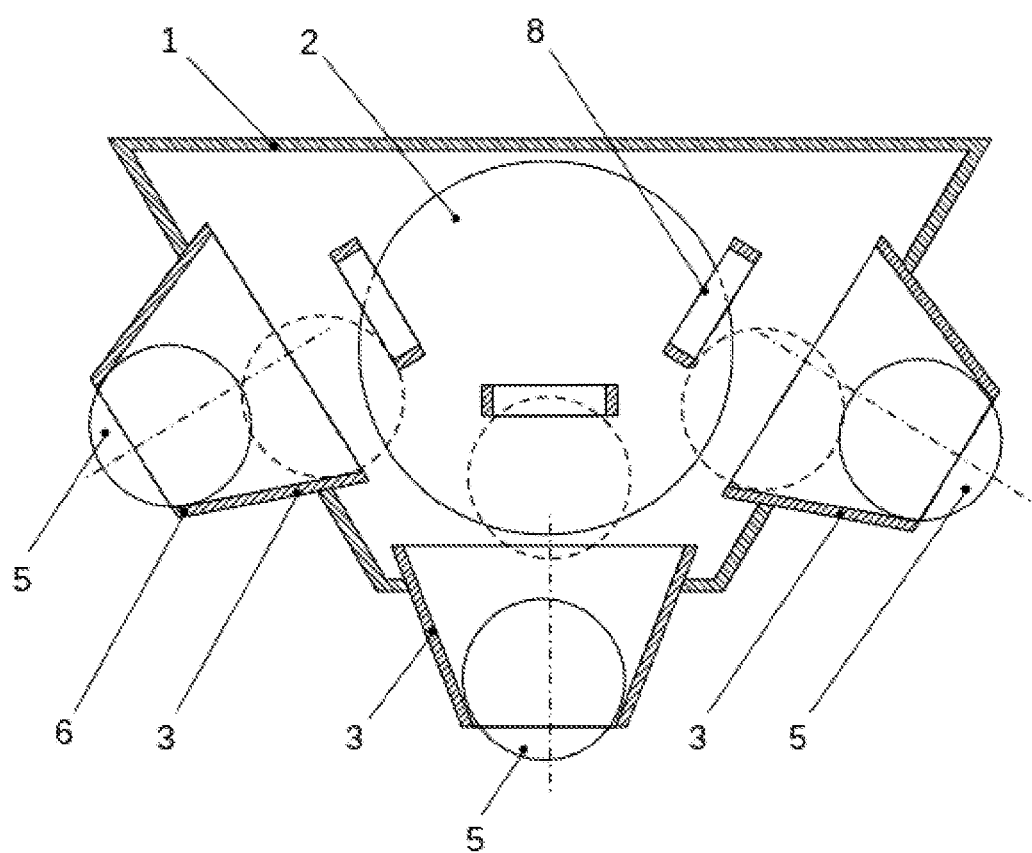
FIG. 7 is a cross-sectional view of the self-sealing back draft damper, suited for wall mounting, containing more than one conical tapered tubes as valve bodies, with axes individually inclined at angle of 90° and angles different than 90° with respect to the horizontal plane

In order to increase the airflow, the damper may contain more than one conical tapered tubes 3 mounted inside the housing 1, whereby the axes of the tubes are inclined or vertically oriented, or both in one housing (FIG. 6 and FIG. 7), relative to the horizontal plane and each tube contains one spherical closing member 5. Certainly, the housing and the valve bodies may be manufactured as one detail and not as separate components.

One of the advantages of the damper using a conical tapered tube as a valve body with preferably spherical closing member is that the spherical closing member 5 being pushed by an occurring backflow will be pressed tightly against the conical tapered inlet 6 of the tube 3, being mounted as described, thereby completely blocking the backflow. If the spherical closing member 5 is manufactured with a shape maximal close to the spherical one, without bumps, irregularities on the surface or visible joints and the cross section of the tube being maximal close to the pure circular one, the sealing when damper is closed will show no gaps and will be basically hermetic.

In the layout containing a slightly inclined conical tapered tube 3 with the spherical closing member 5 moving inside, the damper remains closed if there is no airflow from the ventilated space to the vent, since the spherical closing member 5 self settles at the narrow end of the conical tapered tube 3 and seals the inlet 6 of the damper. It is advantageous that the rolling movement of the spherical closing member 5 proceeds with a minimum drag. Even if the ventilation appliance remains switched off, the inlet 6 will be opened if the minimal pressure difference between both sides of the damper, required for the spherical closing member 5 to be moved upwards inside the conical tapered tube 3, is exceeded. Consequently, if the spherical closing member 5 is manufactured as a low-weight hollow sphere, made of light and tough material, as for example a ping pong ball, even unsupported by a ventilation appliance, the back draft damper will conduct an airflow if the proper conditions for establishing of an even weak airflow to the vent becomes present. The damper will close if the airflow vanishes or changes its direction.

The inlet 6 is fully opened when the ventilation device is working and the closing member 5 is retracted. Being pushed by the airflow, the closing member 5 settles at the opposite end of the conical tapered tube 3, the airflow is directed from the conical tapered inlet 6 through the aperture 4 of the tube, towards the exit openings 2 and the vent.

The invention claimed is:

1. A self-sealing back draft damper for stopping the backflow air, such as through ventilation appliances and systems, comprising:
 a housing having at least one exit opening and the housing contains at least one valve body, and the at least one valve body is characterized in that it is a conical tapered tube, whose axis of the conical tapered tube is inclined with respect to a horizontal plane and a lower-positioned narrow end of the conical tapered tube being airtightly fixed to the corresponding mounting hole of the housing, which narrow end of the conical tapered tube forms a conical tapered inlet of the self-sealing back draft damper, with at least one aperture available on the conical tapered tube contained inside the housing so to enable airflow out of the conical tapered tube towards the exit opening and a following vent, and the conical tapered tube contains inside a spherical closing member with a possibility for free movement, whose diameter is smaller than the inner diameter of the conical tapered tube at its larger end and is comparable, but not smaller, than the inner diameter of the conical tapered tube at its narrow end, and the length of the conical tapered tube and its location inside the housing are so the movement of the spherical closing member inside the conical tapered tube is limited between the conical tapered inlet and preferably a part of the housing, which prevents the spherical closing member to leave the conical tapered tube through its larger end, and the weight of the spherical closing member and the inclination of the conical tapered tube are arranged so in absence of an airflow towards the vent, the spherical closing member is self-positioned at the conical tapered inlet of the self-sealing back draft damper and the spherical closing member can overcome the inclination on its path and is away from the conical tapered inlet under force directed to the vent resulting from a pressure difference appearing between the exit openings and the conical tapered inlet, and the pressure difference arises either under proper environmental conditions or is created by a ventilation appliance, and the self-sealing back draft damper is airtightly attached either with its at least one exit opening by means to the entrance of a ventilation appliance or is airtightly attached by means to the exhaust of a ventilation appliance with one or more inlet openings of the self-sealing back draft damper facing the exhaust of the ventilation appliance or is attached to a vent.

2. The self-sealing back draft damper of claim 1, wherein the axis of the least one conical tapered tube, contained inside the housing, is vertically inclined at an angle 90° with respect to the horizontal plane.

3. The self-sealing back draft damper of claim 1, wherein the at least one exit opening is at one side of the housing and the conical tapered inlets of one or more conical tapered tubes are on the opposite side of the housing.

4. The self-sealing back draft damper of claim 1, wherein the self-sealing back draft damper contains in one housing conical tapered tubes with axes both, inclined at angle different than 90° with respect to the horizontal plane as well as vertically inclined at an angle 90° with respect to the horizontal plane with one spherical closing member in each of the conical tapered tubes.

5. The self-sealing back draft damper of claim 1, wherein the self-sealing back draft damper comprises an additional manipulator as a lever or a spring for accessing and moving the spherical closing member by force applied from outside the housing.

6. The self-sealing back draft damper of claim 1, wherein the spherical closing member is preferably a hollow deformation-resistant ping-pong ball or a hollow body made of aluminum alloy.

7. The self-sealing back draft damper of claim 1, wherein protectors are arranged at any of the at least one conical tapered tube apertures and larger end, and exit openings of the housing, so the spherical closing member is limited inside the conical tapered tube.

8. The self-sealing back draft damper of claim 1, wherein the axis of the at least one conical tapered tube, contained inside the housing, is inclined at an angle different than 90°, with respect to the horizontal plane.

9. The self-sealing back draft damper of claim 1, wherein the at least one aperture available on the conical tapered tube is located at the larger end of the conical tapered tube.

10. The self-sealing back draft damper of claim 1, wherein the at least one aperture is available on the surface of the conical tapered tube in addition to being located at the larger end of the conical tapered tube.

11. The self-sealing back draft damper of claim 1, wherein the housing and the valve bodies are one detail.

* * * * *